July 16, 1963 P. VON MATHES 3,098,152
MEANS FOR MEASURING SCALE MOTIONS
Filed Sept. 30, 1958 2 Sheets-Sheet 1

INVENTOR
Peter Von Mathes

BY: Samuel W. Kipnis
Atty.

INVENTOR.
PETER Von MATHES
BY
Samuel W. Kipnis
Att'y.

United States Patent Office 3,098,152
Patented July 16, 1963

3,098,152
MEANS FOR MEASURING SCALE MOTIONS
Peter Von Mathes, Berlin-Lichterfelde, Germany, assignor to Continental Elektroindustrie A.G., Askania-Werke, Berlin-Mariendorf, Germany, a corporation of Germany
Filed Sept. 30, 1958, Ser. No. 764,418
Claims priority, application Germany Oct. 1, 1957
7 Claims. (Cl. 235—92)

This invention relates to means for measuring scale motions and particularly the extent of angular scale motions as performed for instance by circles of theodolites.

It is known to effect such measurements by counting scale graduations passing a reading post; and, as such a post cannot inherently distinguish forward motions from backward motion of the scale, it has further been proposed to provide for such distinction by developing counting impulses of specific waveshape, for instance with steep rise and gradual fall. This however is subject to a number of objections; for instance, the method fails where the scale motions are performed at greatly variable velocities, as is the case for instance in cinetheodolites and the like.

It has therefore been an object of this invention to avoid such problems and to provide direction-sensitive means for measuring the extent of scale motions, particularly by counting passage of graduations.

The solution has been found in a mechanism of remarkable simplicity, which however differs radically from the devices hitherto employed in this field. In lieu of the usual reading or counting post, there is used, opposite the moving scale, in the embodiment herein illustrated, a combination of stationary comparative scale means and an impulse-generating scanner moving over the scale means and the moving scale, desirably at a velocity in excess of the maximum velocity of the moving scale.

The advantages and more specific features of the new system will now be explained, with reference to FIGURE 1, a perspective view of one embodiment; FIGURE 2, a longitudinal section through the same; and FIGURES 3 and 4, block diagrams of mechanical or electrical control elements in the system. The illustration of course is purely schematic; for instance, only the most essential parts are shown in the first figure and no attempt has been made to show them proportioned in the same way as in the somewhat more detailed second figure.

Figure 1:
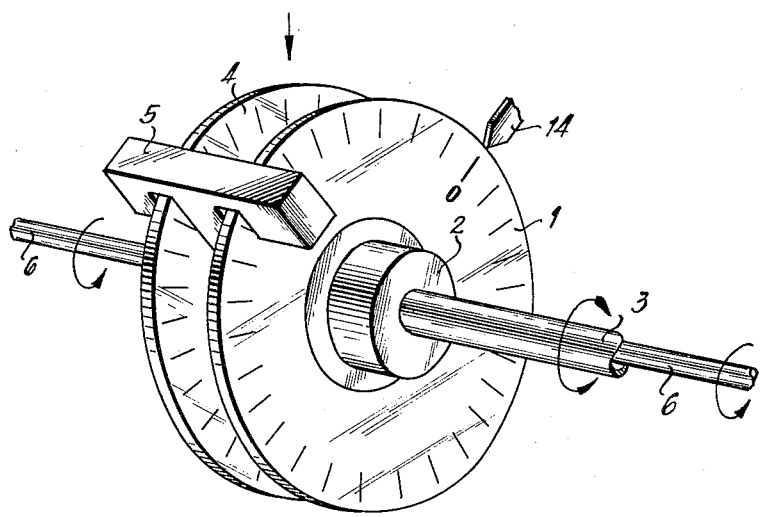
Figure 2:
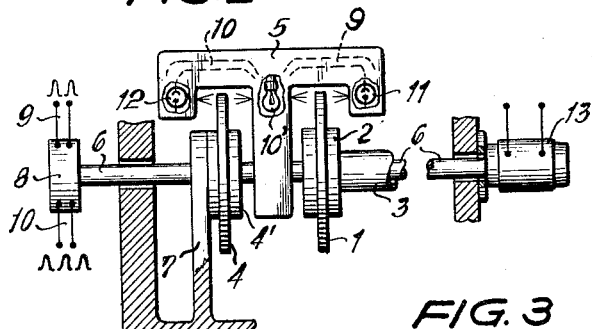

Referring to FIGURE 1: Altitude circle 1 of the cinetheodolite or the like has division marks or graduations thereon, desirably in sufficient number to reduce errors of angle measurements to a value below an allowable tolerance. The circle may be a transparent body of glass with opaque marks, particularly radial lines, suitably etched, photographed or otherwise formed thereon, or of course well-known magnetic marks can be used, or it is possible to use combinations of different types of marks, thus it may be considered that the relatively few marks illustrated serve only for general orientation of a human observer who uses the automatic reading means to be described.

Holder 2 of scale 1 is fast on axle 3 of the cinetheodolite, the telescope-camera part of which is not shown. The motions of that part, and accordingly of axle 3 and scale 1 are very rapid when a target is first brought into the field of vision, whereas thereafter, they often are extremely slow, hesitant and minute, sometimes barely creeping from one temporary position to another; and their direction may change from forward to backward on either slow or fast motions. It may be mentioned at this point that, no matter how fine the graduation of circle 1 may be, it is usually found that the total extent of a motion, for instance of one of the forward motions, exceeds an integral number of graduation intervals by a fraction of such an interval; for this reason it is often desirable not only to count a number of impulses, corresponding with a number of marks, but thereafter also to interpolate the ultimate position of the scale between full graduation points. This latter object will, however, be disregarded herein.

According to the invention there is provided a comparison circle 4, which is stationary, and a scanning device 5 for scanning both circles, this device being fast on shaft 6 which is concentric with (hollow) shaft 3, and being rotated in one direction (see arrows on shaft 6), while shaft 3 is rotated in either direction (see arrow and arrow heads on that shaft).

Referring now to FIGURE 2: holder 4' of comparison circle 4 is secured to a stationary member 7 in the instrument, and provides a bearing for shaft 6. The left end of that shaft carries a device 8 having electrical connectors 9 and 10 which are output members of the scansion means 5. That means, in turn, comprises a light source 10' for homogeneously illuminating graduated areas of both circles 1 and 4, and photo-electric elements or tubes 11 and 12, one opposite each circle, for response to light and shadow effects as graduations move relatively thereto, and for thereby generating the electrical impulses, schematically shown at outputs 9 and 10. Scanner shaft 6 is rotated by a controlled-speed motor 13.

At the start of operation the zero mark of theodolite circle 1 may coincide with a suitably selected position, shown in FIGURE 1 at 14, which is otherwise unimportant for the present invention; it need not coincide with any particular mark of comparison circle 4, as suggested by the vertical arrow. Motor 13 is now started to rotate scanning means 5 over circles 1 and 4 with an appreciable, not necessarily constant, velocity. So long as circle 1 remains at the original position the numbers of scanning light impulses received and of counting electrical impulses emitted by each photosensitive element 11 and 12 is always the same and their difference is zero. Assuming now that theodolites circle 1 is angularly moved while the scanning continues, theodolite scanner 11 receives more or fewer impulses than comparison scanner 12 does, during and proportionally to the theodolite motion. The difference between numbers of impulses so received is equal to the number of theodolite graduations which have passed position 14 at each moment, and is available as a counting input at 9, 10.

It is unimportant what exact velocity is used for the scanning motion and whether such velocity is uniform. It is, however, desirable that the scanning motion be not only faster, but appreciably faster, than the fastest angular motion of the theodolite circle. All impulses from this source will then not only be indicative of relative motion in the same direction, whether circle 1 be moved in one or the other angular direction, but additionally, all impulses will be sharply defined, whether circle 1 be moved rapidly or slowly.

Figure 3:
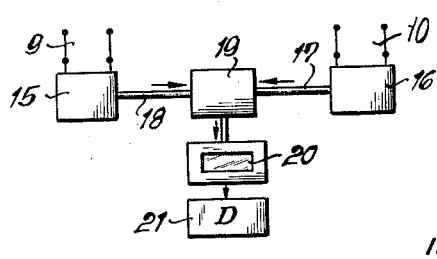

The utilization of counting output 9, 10 is schematically shown in FIGURE 3, where each output line is connected with an individual counting system 15 and 16, for instance a stepping switch or an electronic flip-flop system. Each counting system 15, 16 has an output member such as a shaft 17, 18 rotating one of the primary gears of a gear differential 19, the planet gear of which moves, by a third shaft, a differential count indicator 20 and if desired, a recorder 21 or the like.

In lieu of mechanical computer elements such as differential 19, other expedients can of course be used, for instance an electronic differential utilizing a suitable subtracting circuit and desirably, a binary-to-decimal conversion circuit. The arrangement can be simple as the scanning mechanism, as mentioned, always furnishes a positive number of theodolite circle graduations counted by system 15, and of course, also a positive number of comparison counts at 16. Either number is the greater one, depending on whether the rotation of the theodolite circle 1, corresponding to the number recorded in system 15, was in the same direction as the rotation of scanner 5 (in which case 15 records less than 16 does) or in the opposite direction (in which case 15 records more than 16 does). Accordingly output member 20 of mechanical or electronic differential 19 moves or counts either forwardly or backwardly, depending on whether theodolite circle 1 moves successively in the same direction or alternately in opposite directions.

It is also possible, particularly with an electronic counter system, to form subtotals of counts of theodolite circle graduations and corresponding subtotals of comparison counts and to subtract subtotals from one another. This is not only desirable as it allows economy in computer design; it also facilitates the ultimate utilization of the counts, for instance in a cinetheodolite, which intermittently exposes a target image to a film (not shown) and desirably exposes, simultaneously, a recording of circle position to the same film. Hundreds or thousands of exposures can be made per second, while millions of counts of angular second or fractional second graduations take place; or in other types of instruments, the mass of graduations counted may be smaller than that of exposures or equivalent reading-out operations. In either case, flexible and economical operation is possible by means of the mechanism described. Subtotals, for instance, can be stored in core memories of known design, the reading out of which can be triggered by the film exposure mechanism. In a system of this kind it is also possible to store variable subtotals, for instance in a memory 20, and postpone formation of the recording, at 21, until the triggering takes place. The record D of the counting difference can then be utilized in a variety of ways; for instance, it can be photographed on a suitable portion of the film segment recording each target exposure.

Figure 4:
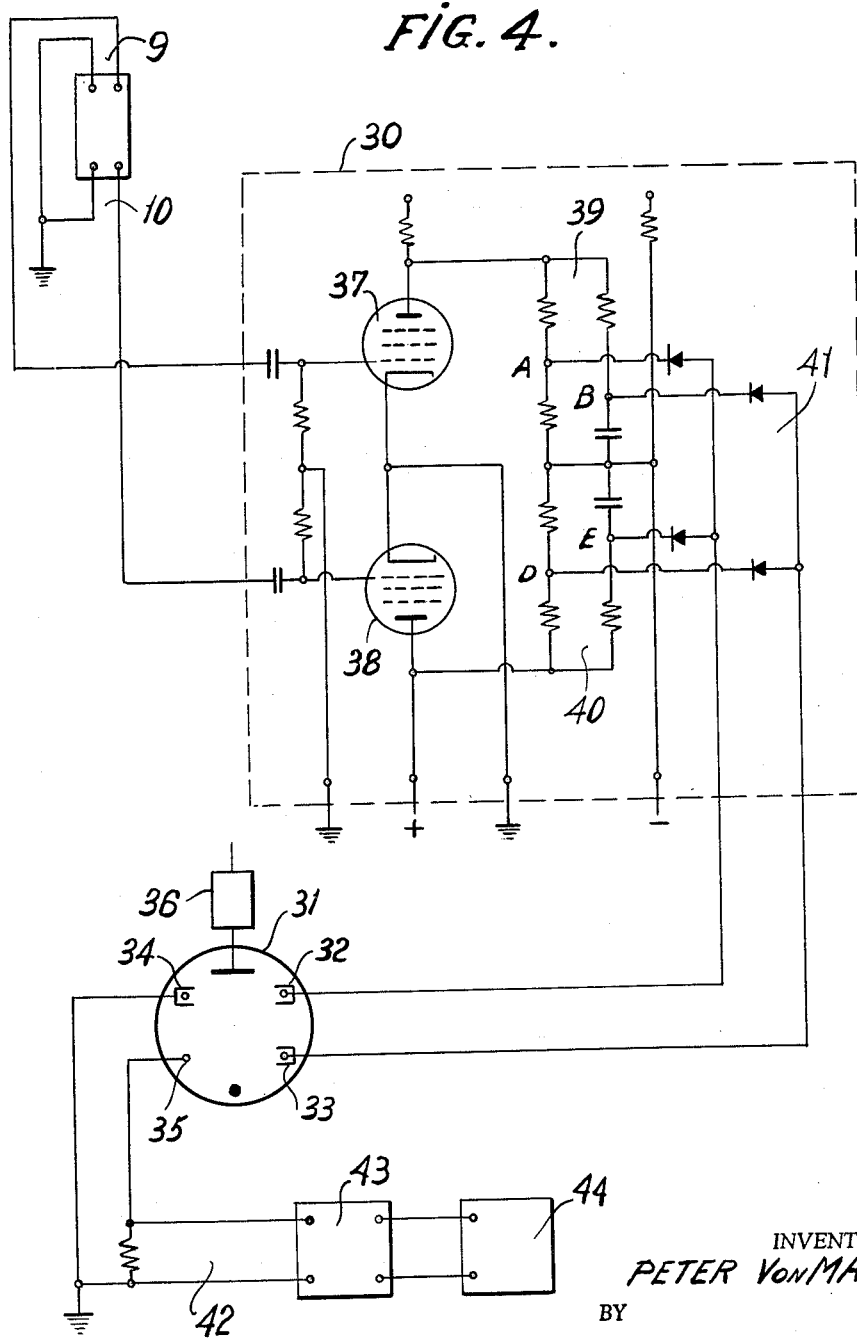

In the preferred electronic counter system of FIGURE 4 impulses from terminals 9 and 10 are first adapted for counting by a gate circuit 30 having suitable power and ground terminals as generally suggested and are then counted in a cold cathode tube 31 of the known polycathode type with dual auxiliary cathodes 32, 33, counting cathodes 34, decade or equivalent cathode 35 and plate power supply 36. In such tubes the discharge glow proceeds in one direction around the ring of counting cathodes if impulses occur in the several primary auxiliary cathodes 32 and shortly thereafter in the several secondary auxiliary cathodes 33; otherwise, it proceeds in the opposite direction.

Gate circuit 30 includes pentodes 37, 38, the control grids of which receive the signals from 9 and 10, respectively. Their plates are connected, respectively, to known phase-shifting circuits 39, 40, each of which comprises a voltage divider system for deriving from each impulse a pair of impulses, the second of which follows shortly after the first; the original impulses arriving at A or D and the delayed ones at B or E. Original impulses from 39 and delayed ones from 40 are impressed, via rectifier system 41, on primary auxiliary cathodes 32, the others correspondingly on 33. As a result, if equal numbers of impulses occur at 9 and 10 during a unit of time the glow in tube 31 remains stationary regardless whether there is coincidence, overlapping or noncoincidence of such impulses; in the latter cases there is merely a very brief shift of the glow to one of the auxiliary cathodes. The count can be read directly on tube 31 or can be fed via circuits 42, 43 to a decimal or other indicator unit 44, where it can be spaced, desirably, by any desired multiples of the graduation interval plus fractions of such interval, so as to uniformly subdivide the impulse intervals produced by any one such scanner. For instance four such scanners can thus produce a combined pulse output having intervals one-fourth as long as otherwise, and any other, rational fraction of the basic division interval can thus be produced, to such extent as the available space for the mounting of scanner heads will allow. Such space can further be economized by arranging the several scanners of each circle in nonius fashion.

On the other hand the tangible comparison scanner means 5, 12 can be replaced by electronic pulse generating means, adapted to produce a frequency-regulated or frequency-constant series of comparing pulses, directly applied to system 16; and similarly pulse generator system 5, 11 can be replaced by any other means for producing pulses in basically frequency-regulated ways, dependent on motions of theodolite shaft 3 or equivalent mechanism. Regardless of such variations the rapid counting of massive numbers of graduations, combined with the simultaneous comparative counting as described, furnishes a highly accurate and flexibly usable measurement of the extent of motion to be determined, for all purposes of indication, recording, control and the like.

I claim:
1. In apparatus for determining the extent of angular displacement, if any, of an intermittently angularly displaceable instrument scale element, such as a theodolite shaft: a stationary comparison scale element; scanning means cooperating with both scale elements and adapted to be rotated thereover; means for constantly rotating the cooperating scanning means, at velocities exceeding those of the most rapid angular displacement of the instrument scale element; means for constantly emitting a primary continuous sequence of pulses, in response to the rotation of the cooperating scanning means over the instrument scale element; means for constantly emitting a secondary continuous sequence of pulses, in response to the rotation of the cooperating scanning means over the comparison scale element; and means for subtracting the pulses of the primary sequence from those of the secondary sequence and continuously registering the overall difference.

2. Apparatus as described in claim 1, wherein each of said scale elements is a graduated circle and the cooperating scale means comprises a pair of graduation scanners, rigidly coupled for conjoint rotation.

3. Apparatus for continuously indicating the rotational position of a shaft comprising a first transducer element mounted on the shaft, a second transducer element mounted for rotation about the axis of the shaft adjacent to the first element, said elements being operatively associated for the continuous production of pulses at all times directly proportional in rate of occurrence to the rate of relative motion therebetween, means for rotating the second element in a constant direction at a speed exceeding the maximum speed of the shaft under measurement, second pulse-producing means for producing pulses at all times directly proportional in rate of occurrence only to the speed of rotation of the second element, the factors of proportionality being equal, and means for continuously registering the difference in the total numbers of pulses produced by said second pulse-producing means and said transducer elements, whereby the registering means continuously indicates the rotational position of the shaft under measurement.

4. Apparatus for continuously indicating the rotational position of a shaft comprising a second shaft, means for driving the second shaft in one direction at a speed exceeding the maximum rotational speed of the first shaft, means for continuously producing pulses at all times directly proportional in rate to the rate of relative rotational motion between the shafts, means for producing pulses at all times directly proportional in rate to the rate of rotation of the second shaft, the factors of proportionality being equal, and means for continuously registering the difference in the total numbers of pulses produced by the respective pulse-producing means, whereby the registering means continuously indicates the rotational position of the shaft under measurement.

5. Apparatus for continuously indicating the rotary position of a shaft bearing equally spaced circumferential markings comprising unidirectional rotary scanning means for continuously scanning the markings and producing a pulse upon each passage past a marking, means for continuously producing in each revolution of the scanning means a number of equally spaced pulses equal to the number of markings on the shaft, and means for continuously subtracting the number of pulses produced by one of said means from the number produced by the other, so that the difference at any instant is continuously indicative of total movement of the shaft from an original position.

6. The apparatus of claim 5 wherein the second pulse-producing means comprises a stationary member having markings corresponding to the markings on the shaft and a second scanning means mounted for rotation with the first scanning means.

7. Apparatus for continuously indicating the rotary position of a shaft comprising a unidirectionally driven rotary member coaxial with the shaft, continuously operable means on the rotary member and the shaft to produce pulses proportional in rate of occurrence to the rate of relative motion between the rotary member and the shaft, continuously operable means to produce pulses identically proportional to the rate of rotation of the rotary member with respect to a fixed reference, and continuously operable means to indicate the difference in the total numbers of pulses so produced.

References Cited in the file of this patent
UNITED STATES PATENTS

| | | |
|---|---|---|
| 1,878,658 | Aronoff | Sept. 20, 1932 |
| 2,575,342 | Gridley | Nov. 20, 1951 |
| 2,656,106 | Stabler | Oct. 20, 1953 |
| 2,730,698 | Daniels et al. | Jan. 10, 1956 |
| 2,770,798 | Roth | Nov. 13, 1956 |
| 2,775,755 | Sink | Dec. 25, 1956 |
| 2,803,448 | Biebel | Aug. 20, 1957 |
| 2,848,605 | Kuchinsky | Aug. 19, 1958 |
| 2,881,418 | Stephens et al. | Apr. 7, 1959 |
| 2,901,170 | Poole | Aug. 25, 1959 |
| 2,915,703 | Kessler | Dec. 1, 1959 |
| 2,930,895 | Kuehne | Mar. 29, 1960 |